United States Patent [19]
Price

[11] 3,742,204
[45] June 26, 1973

[54] KNOB ASSEMBLIES FOR GEAR-SELECTRO LEVERS IN MOTOR VEHICLES

[76] Inventor: Ernest James Price, 15 Harvard Road, Solihull, England

[22] Filed: Mar. 11, 1971

[21] Appl. No.: 123,364

[30] Foreign Application Priority Data
Mar. 13, 1970 Great Britain.................. 12,102/70

[52] U.S. Cl.................... 240/7.1 R, 74/523, 74/543
[51] Int. Cl............................................. B60q 3/00
[58] Field of Search................... 240/7.1 R; 74/543, 74/523, 473 R, 473 P; 16/121

[56] References Cited
UNITED STATES PATENTS
1,541,209   6/1925   Cotten et al..................... 240/7.1 R
1,548,197   8/1925   Kendall et al..................... 240/7.1 R

*Primary Examiner*—Milton Kaufman
*Attorney*—Scrivener, Parker, Scrivener and Clarke

[57] ABSTRACT

A knob for the gear-selector lever of a motor vehicle is so mounted that it can rock about at least one axis. In use this axis is preferably transverse to the direction of motion of the car. There may be a ball-and-socket connection between the knob and the lever allowing the knob to rock universally. The knob may be retained in position by friction, and the frictional resistance to rocking may be adjustable. There may be an electric lamp inside the knob.

8 Claims, 3 Drawing Figures

PATENTED JUN 26 1973 3,742,204
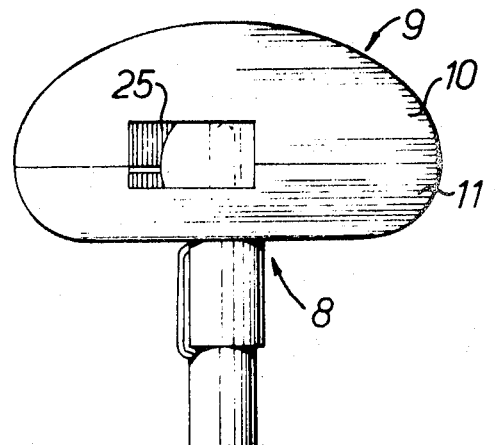
_Fig_ 1 _
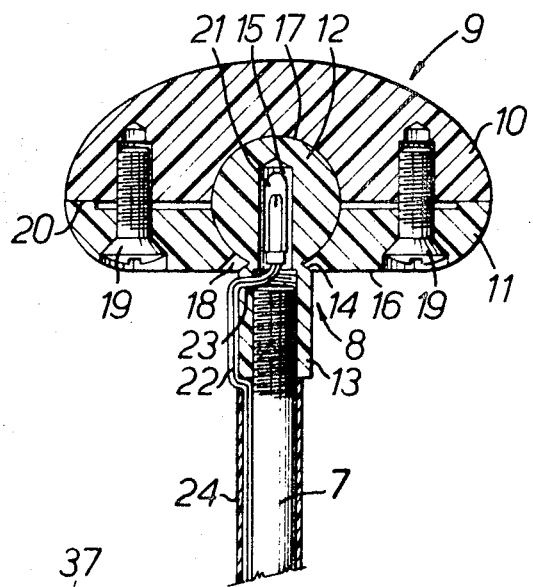
_Fig_ 2 _
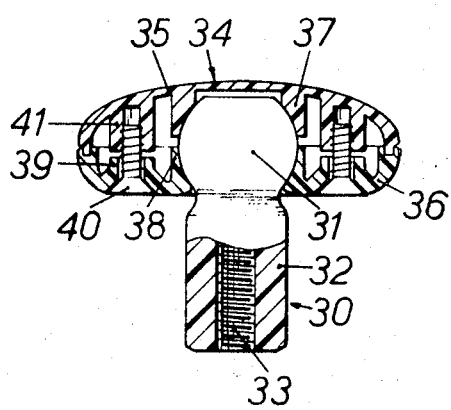
_Fig_ 3 _

KNOB ASSEMBLIES FOR GEAR-SELECTRO LEVERS IN MOTOR VEHICLES

This invention relates to knob assemblies for gear-selector levers in motor vehicles, and particularly, though not exclusively to knob assemblies for gear-selector levers of the kind projecting upwards from the floor as opposed to those of the kind mounted on the steering-wheel casing.

Conventional knob assemblies for this purpose comprise a unitary knob with an integral tubular socket which may be internally screw-threaded, the knob being mounted with the end portion of the lever entering the socket.

When such a knob assembly is in use the driver, in changing gear, holds the knob and moves it from one position to another. The lever tilts during this movement and as a result either the driver has to rotate his hand slightly or the driver must allow the knob to rotate slightly in his hand. The present invention aims to avoid the need for either movement.

According to the present invention there is provided a knob assembly for the gear-selector lever of a motor vehicle comprising a knob and mounting means for the knob, the mounting means being rigidly connected to or adapted to be rigidly connected to the gear-selector lever or forming part of the gear-selector lever characterized in that there is coupling means between the knob and the mounting means to permit rocking movement of the knob relatively to the mounting means about at least one axis transverse to the lever.

In use when the driver changes gear he can grip the knob and manipulate the lever without having to rotate his hand in any predetermined manner and without having to allow the knob freedom to rotate in his hand.

Preferably there are frictional forces acting between the knob and the mounting means, which forces tend to retain the knob in any set position relative to the mounting means. The frictional forces are such that the knob does not tend to move freely, influenced by small forces such as those due to a change of motion of a motor vehicle in which the assembly might be fitted, but may readily be moved by hand. Further the assembly is adjustable so as to vary the frictional forces to compensate for wear between the two members and to suit the differing requirements of various users. Also the rotation about any transverse axis may be limited so as not to exceed 60°. The limits of rotation may be set in accordance with the intended application of a knob assembly so that, when the assembly is in use, should the knob be knocked accidentally to a position of maximum rotation it remains relatively easy for the user to obtain a proper grip on it without first reorientating it.

In a preferred construction the knob is fitted to the mounting means by way of a ball-and-socket joint. The mounting means may be constituted by a ball and fixed to the manipulatory end of a gear-selector lever, the knob having a complementary socket. Where there is a diagram on the knob indicating the positions of selection of the gears, means may be provided to prevent rotation of the knob about the axis of the gear-selector lever so that the knob and diagram remain correctly orientated. A similar result could be obtained with the use of a universal joint.

The knob assembly may have only a single transverse axis of rotation. Where such an axis is used it is intended that, when the knob is in use, this axis should be substantially perpendicular to the fore-and-aft direction of movement of the gear-selector lever in the vehicle in which the knob is fitted.

The knob assembly outlined above can be fitted to a gear-selector lever in a motor vehicle as a replacement of a knob previously installed or it might be installed by the manufacturer as part of the original equipment of the vehicle.

Where a knob assembly in accordance with this invention is installed as part of the original equipment the mounting means may be formed integrally with the gear-selector lever.

The invention will now be more particularly described with reference to the accompanying drawings in which:

FIG. 1 is a side view of a knob assembly in accordance with the present invention, FIG. 2 is a section of the knob assembly shown in FIG. 1, and FIG. 3 is a section, similar to FIG. 2 but illustrating a modified knob.

The knob assembly illustrated in FIGS. 1 and 2 of the drawings comprises three mouldings of a resilient plastics material: a mounting member 8 and upper and lower segments 10 and 11 of a knob 9.

The mounting member 8 carries a ball 12 and comprises a tubular portion 13 formed integrally with the ball, the axis of the tubular portion passing through the center of the ball. A small neck 14 is formed where the ball 12 and the tubular portion 13 meet. The tubular portion 13 is of such a diameter that its bore can be threaded for fitment to the manipulative end of a gear-selector lever which is externally threaded. The ball 12 is of larger diameter than the tubular portion 13 and is formed with a blind cylindrical hole 15 which is coaxial with the tubular portion, smaller in diameter than the bore of the tubular portion, and extends almost entirely across the ball.

The knob 9 is of a generally oblate spheroidal shape divided along its equatorial plane into an upper segment 10 and a lower segment 11. The lower segment 11 has a somewhat flattened lower face 16 so that the greater part of the segment comprises a disc of constant thickness. A spherical cavity 17 of the same diameter as the ball 12 is formed concentrically within the knob 9, and communicates with the exterior of the knobs by a short conical passage 18 in the lower segment 11 axially aligned with the minor axis of the knob and intersecting the spherical cavity 17 in a circle of the same diameter as the outside of the tubular portion 13.

The parts are assembled together by first passing the tubular portion 13 through the conical passage 18 so that the ball 12 is seated on that part of the spherical cavity 17 formed in the lower segment 11. The upper segment 10 is fitted to the lower segment 12 completing the knob 9, with the ball located in the cavity 17. Two screws 19 passing through the lower segment 11 and screwing into the upper segment 10 hold the two segments together. The greater part of that face of the lower segment 11 abutting the upper segment 10, that is the face on the plane of division of the knob 9, is relieved so that only a narrow band 20 on the periphery of said face of the lower segment abuts the upper segment. Thus when the screws 19 are tightened the lower segment 11, being formed from a resilient plastics material, tends to flex inwards at its center so that the ball 12 is frictionally gripped between the two segments 10 and 11. The screws can be adjusted to vary the friction, and thus the resistance to rotation of the knob 9 relatively to the mounting member 8, as required by the user.

The mounting member 8 is attached to a gear-selector lever 7. The tubular portion 13 passes over the manipulatory end of the lever 7 and the two parts are held together by complementary threads. The thread in the tubular portion 13 as shown in FIG. 2 is preformed, but in an alternative arrangement the thread on the tubular portion is formed during fitment of the assembly to the lever by a self-tapping action, the lever being metallic while the tubular portion is made of a resilient plastics material.

An electric lamp 21 is fitted in the hole 15 in the ball 12 and suitable electrical leads 22 are connected to it. The electrical leads 22 pass through a small hole 23 in the tubular portion 13 near the neck 14 and are connected by way of a switch to the normal electrical supply system in the motor vehicle to which the knob is fitted. Two leads 22 are shown in the drawings but in some cases there may only be one lead fitted, the gear-selector lever 20 being used as an earth terminal in accordance with the usual practice of motor vehicle electrical circuitry. The lead or each lead passes from the knob assembly down the side of the lever 20 to the floor of the vehicle and is located in position on the side of the lever by the sleeve 24 which also serves to conceal the lead or leads.

In order that light emitted by the electric lamp 21 in the ball 12 can pass out of the ball, the ball is moulded from a transparent or translucent plastics material. Nylon is particularly suitable since it is not only naturally translucent but also resilient. The segments of the knob may also be transparent or translucent, or they may be opaque and formed with a window 25 as shown in FIG. 1. The knob may have a window in addition to being translucent. The window can be used at night to direct a beam of light onto a map or the like, and where the knob is translucent the light can be used at night to indicate the position of the gear-selector lever. Also, where there is a diagram on the knob indicating the positions of selection of the gears, the emitted light may be so directed as to illuminate the diagram.

The particular knob illustrated in FIGS. 1 and 2 of the drawings is shown in a position normal to the lever 20 and may be tilted up to about 15° from the normal in any direction, the extent of tilt being limited by the edge of the neck 14 coming into abutment with the surface of the conical passage 18. The knob 9 may also rotate about the axis of the lever 20 but in an alternative construction this is prevented by the provision of a rib (not shown) substantially parallel to a plane containing said axis, formed on the ball 12, and engaging a complementary groove in the knob 9. This rib and this groove restrict rotation of the knob 9 about the mounting member 8 to a single axis transverse to the lever 20. If the groove is somewhat broader than the rib some rotation about another transverse axis is also possible, although the arrangement still precludes significant rotation of the knob about the axis of the lever.

Further in an alternative form of construction an electric switch may be incorporated in the assembly, which switch may be adapted to operate electrical components in a vehicle to which the assembly is fitted.

The knob shown in FIG. 3 is largely similar to that shown in FIGS. 1 and 2 but incorporates various minor modifications. The knob assembly includes a mounting member 30 similar to the mounting member 8 and comprising a ball 31 and a tubular portion 32 with a threaded bore 33. There is, however, no hole in the ball 31 and no electric lamp.

The assembly also includes a knob 34 comprising an upper segment 35 and a lower segment 36. The segments 35 and 36 are of relatively thin and substantially uniform wall-thickness. The segments 35 and 36 include annular portions 37 and 38 respectively with part-spherical bearing surfaces which engage the ball 31. The lower segment 36 has four tubular pillars 39 for receiving securing screws 40, the screws entering the threaded bores of axially aligned pillars 41 on the upper segment 35. The rim of the lower segment 36 has a groove entered by a complementary rib on the rim of the upper segment 35. There are gaps between the annular portions 37 and 38, and similar gaps between the pillars 39 and 41, the arrangement being such that when the screws 40 are tightened the segments 35 and 36 are caused to flex resiliently, and the portions 37 and 38 are urged towards one another and afford increased frictional resistance to the rotation of the ball 31.

Here again the knob of FIG. 3 may be modified to incorporate a rib and groove assembly, or it may incorporate an electric switch, or both.

I claim:

1. A knob assembly for the gear-selector lever of a motor vehicle comprising a knob, mounting means adapted for rigid attachment to the gear-selector lever of a motor vehicle, and coupling means operative between the knob and the mounting means to permit rocking movement of the knob relatively to the mounting means about at least one axis which extends through the knob in a direction transverse to the mounting means.

2. A knob assembly according to claim 1 in which said coupling means comprises a ball-and-socket joint operative to allow universal rocking movement of the knob relatively to the mounting means.

3. A knob assembly according to claim 2 in which there is screw-operable means enabling the frictional resistance to movement of the ball-and-socket joint to be adjusted.

4. A knob assembly according to claim 3 in which the ball of the ball-and-socket joint is on the mounting means, and the knob is formed from parts each affording socket faces, the screw-means being operative between said parts to vary the forces applied by the faces to the ball.

5. A knob assembly according to claim 1 with an electric lamp bulb mounted inside it and means allowing light from the lamp to be seen outside the assembly when the lamp is illuminated.

6. In a motor vehicle of the kind having gears and a substantially rigid gear selector lever operatively connected at one end to said gears for manual operation thereof, a knob at the other end of said lever, coupling means between said other end of said lever and said knob connecting said knob with said lever, said coupling means being constructed and arranged to permit rocking movement of the knob relative to said lever about at least one axis transverse to the lever.

7. In the motor vehicle of claim 6 wherein said coupling means comprises a first part substantially rigidly joined to said other end of said lever and a second part rockingly supporting said knob whereby said knob is permitted said rocking movement relative to said lever.

8. In the motor vehicle of claim 6 wherein said transverse axis extends through said knob.

* * * * *